F. C. BUELL.
SELF LUBRICATING DEVICE FOR JOURNAL BOXES.
APPLICATION FILED FEB. 12, 1919.
1,308,887.
Patented July 8, 1919.
2 SHEETS—SHEET 1.
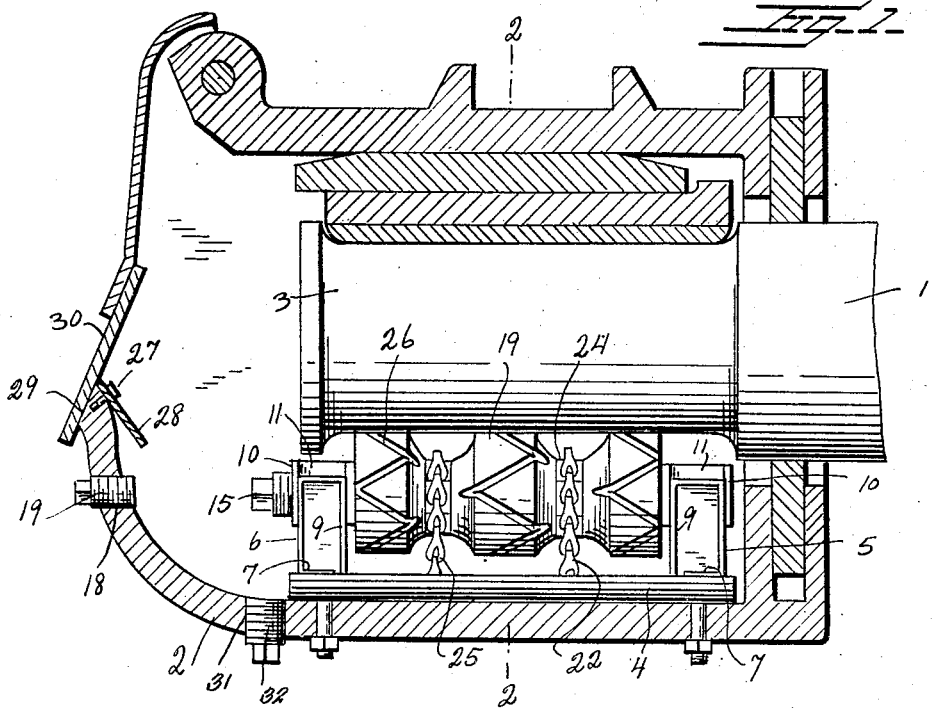
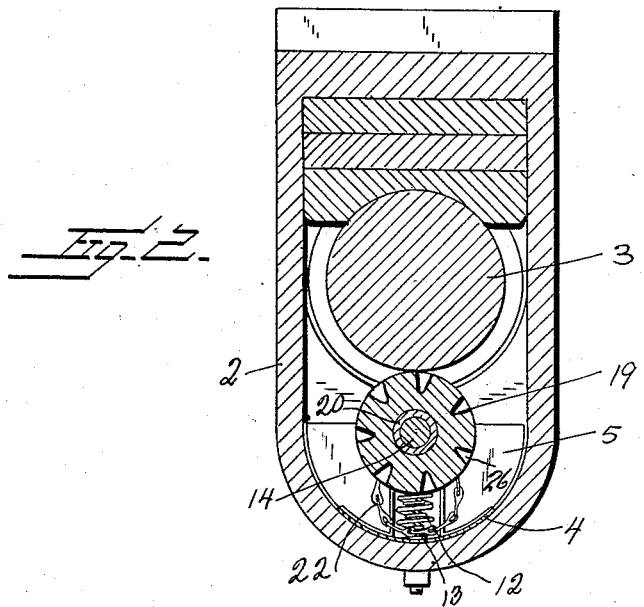
Inventor
F. C. Buell
By Watson E. Coleman
Attorney F. C. BUELL.
SELF LUBRICATING DEVICE FOR JOURNAL BOXES.
APPLICATION FILED FEB. 12, 1919.
1,308,887.
Patented July 8, 1919.
2 SHEETS—SHEET 2.
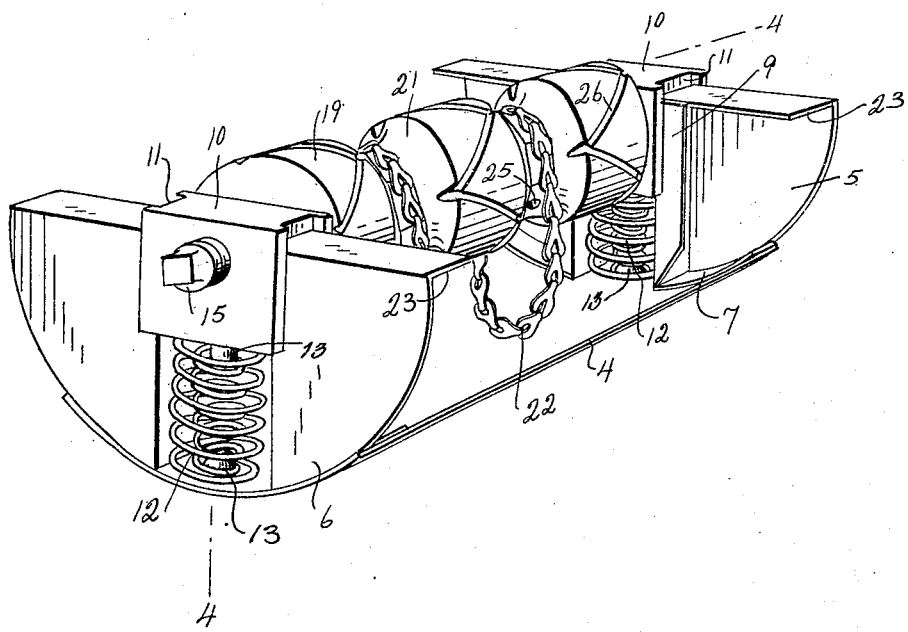
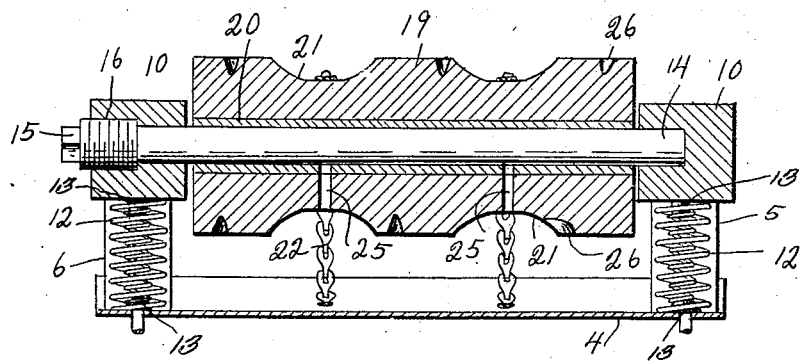
Inventor
F. C. Buell
By Watson E. Coleman
Attorney

UNITED STATES PATENT OFFICE.

FOYDICE C. BUELL, OF ST. AUGUSTINE, FLORIDA.

SELF-LUBRICATING DEVICE FOR JOURNAL-BOXES.

1,308,887. Specification of Letters Patent. Patented July 8, 1919.

Application filed February 12, 1919. Serial No. 276,498.

*To all whom it may concern:*

Be it known that I, FOYDICE C. BUELL, a citizen of the United States, residing at St. Augustine, in the county of St. Johns and State of Florida, have invented certain new and useful Improvements in Self-Lubricating Devices for Journal-Boxes, of which the following is a specification, reference being had to the accompanying drawings.

This invention relates to an improved automatic or self-lubricating device for journal boxes, for railway car axles and the like.

The invention aims to provide a self-lubricating device, which will not only render a saving in the lubrication, but will also permit of increased mileage on the amount of lubricant now in use, with greater efficiency.

The invention further aims to provide a self-lubricator, which will avoid waste of the oil, and will render a saving in the amount of brass to be used.

The invention further aims to provide a lubricator, in which the lubricant is repeatedly employed, for lubricating the journaled ends of the car and locomotive axles.

A further object of the invention is to afford constant revoluble members, revoluble motion being imparted thereto, owing to the members being in contact with the journaled ends of the axle there being means on the revoluble members, acting to splash or agitate the lubricant, and distribute it to the contact parts.

A further object of the invention is to provide spring tensioned guide bearings for the shaft of the revoluble member, in order to yield incident to the vibration of the truck.

A further object of the invention is to provide guides for the guide bearings, and deflecting walls for returning the lubricant to the center of the journal box, so as to be agitated by the means on the revoluble member.

A further object of the invention is to provide lubricant conducting channels or grooves on the revoluble member, for conveying the lubricant to the guide bearings.

A further object of the invention is to provide retaining means on the revoluble member, for retaining the splashing or agitating means in substantially uniform locations.

While the structure now illustrated, and described is deemed preferable, in a reduction of the structure to a practical form for commercial purposes, alterations may be required, and the right to these alterations is claimed provided they are warranted within the scope of what is claimed.

The invention comprises further features and combination of parts, as hereinafter set forth, shown in the drawings and claimed.

In the drawings:

Figure 1 is a sectional view through a journal box showing the end of the axle journaled therein, and self-lubricating device applied.

Fig. 2 is a sectional view on line 2—2 of Fig. 1.

Fig. 3 is an enlarged detail perspective view of the self-lubricating device removed from the journal box.

Fig. 4 is a sectional view on line 4—4 of Fig. 3.

Referring more especially to the drawings 1 designates an axle and 2 denotes the journal box, in which the end of the axle 3 is journaled. A self-lubricating device is disposed on the interior of the journal box in the bottom thereof, and it comprises the curved or flat bottom plate 4 and the end guide plates 5 and 6. The curved portions of the plates 5 and 6 are provided with lateral flanges 7, to which the segmental curved plate 4 is secured. The flanges 7 extend inwardly toward each other. The end flanges 5 and 6 are spaced, as shown, and the vertical edges of the plates 5 and 6 have lateral flanges 9. The end plates 5 and 6 are spaced in order to provide guides 9 for the guide bearings 10. The guide bearings have their side edges provided with grooves or channels 11, for the reception of the vertical flanged edge parts of the end plates 5 and 6. Interposed between the guide bearings and the upper end surfaces of the plate 4 are coil springs 12. Each of the coil springs is constructed from a single piece of steel or brass spring wire of heavy gage, which is coiled, providing a small spring on the interior of a larger spring, the opposite ends of the inner spring being maintained in position and against displacement by the devices as shown at 13.

Mounted in the guide bearings is a shaft 14. It is to be observed that the inner guide bearing 10 has a closed recess for one end of the shaft 14, thereby preventing inward movement of the shaft. The opening in the other guide bearing is open-ended, so that the shaft may pass through the same when arranging the shaft in position. A screw cap 15 is threaded into the opening 16 of the outer guide bearing to prevent axial movement of the shaft. It is to be noted that the wall of the journal box is provided with an opening 18, for the reception of screw plugs 19′. This opening 18 is in axial alinement with the shaft 14, in order to permit the removal and insertion of the shaft in its guide bearings.

A revoluble lubricant distributing member 19 is provided, the bore through this member 19 is lined with a brass sleeve 20, through which the shaft 14 extends. It is obvious that this sleeve rotates with the revoluble lubricant distributing member 19. The revoluble member 19 is provided with annular channels 21, which are engaged by the centrifugal actuating chains 22. These chains are in the form of link or closed loops, and when the member 19 is at rest, these chains depend from the member and hang in the lubricant, which is contained on the surface of the plate 4. It is obvious that the cylindrical surface of the member 19 contacts with the end 3 of the axle. Therefore, when the axle is in motion, revoluble movement will be imparted to the member 19. This movement of the member 19 will cause the chains 22 to swing outwardly owing to the centrifugal action, and agitating the lubricant and splashing the same upon all contacting parts, and it is obvious that the lubricant returns to the surface of the plate 4, when the moving parts are at rest.

It is to be observed that the plates 5 and 6 have on their upper edge portions inwardly extending lateral flanges 23, which together with the flanges 9 act to return the lubricant to the surface of the plate 4. In other words, the flanges 9 and 23 act as lubricant guards or deflectors.

The bottoms of the annular channels 21 are provided with flat portions, which not only act as agitating means for the lubricant, should the level of the same reach the bottoms of the channels, but also act as means to prevent the bottoms of the channels from rotating with relation to the splashing chains, without imparting a swinging or centrifugal movement to the chains. However, it is obvious that there will be some slipping action between the chains and the bottoms of the channels, but not enough to foil the purpose of the splashing chains. It is obvious that the faster the revoluble member rotates, the more secure will the chains adhere to the bottoms of the channels, therefore the actions will be more efficient. The bottoms of the channels 21 of the member 19 are provided with openings 25, which extend entirely through brass sleeve of the annular member 19, so that certain of the lubricant will feed to and contact with the shaft 14.

The outer circumference of the revoluble member 19 intermediate the adjacent channels, and between the channels and the ends of the member 19 are lubricant feeding grooves 26, which are obliquely disposed and have their bottoms almost on a level with the bottoms of the channels, and act to feed the lubricant toward the ends of the revoluble member or roller 19 to the guide bearings. The intermediate lubricant feeding grooves 26 will act to convey lubricant from one channel to another.

It is to be noted that the wall of the journal box has secured thereto as at 27 a deflector plate 28 which is inclined at an acute angle to the wall of the journal box and constitutes means to deflect the lubricant back to the bottom of the journal box, thereby preventing the lubricant from overflowing and passing out through the filling opening 29 of the journal box, which openings are closed by the member 30. The bottom wall of the journal box has a draining opening 31, which is threaded for the reception of a plug 32. This plug may be removed for draining the journal box of the lubricant.

By the employment of this invention, the use of all waste is eliminated. Further in all mechanisms, where revoluble elements or parts are provided, this lubricator may be installed, and may be constructed to fit any style or construction of journal box, having either flat or round bottoms or any like construction. If desired the parts 4, 5, 6 and 7 of the frame may be constructed or cast in one piece. Also a frame and lubricator constructed substantially as embodied herein may especially be employed for use in connection with second-hand journal boxes, that is those now in use. In this case, however, the frame may be fastened to the journal box in any conventional manner.

The invention having been set forth, what is claimed as new and useful is:

1. The combination with a journal box, of an axle having its spindle end journaled in the box, means in frictional contact with the spindle end and given a revoluble movement by its relation with the spindle end, and means loosely carried and suspended on the first means and adapted to swing outwardly by the centrifugal action, agitating and splashing the lubricant in the bottom of the journal box.

2. The combination with an axle, a journal box for the spindle end thereof, revoluble means mounted in the journal box and in contact with the spindle end, and devices loosely carried and suspended on the revoluble means, and adapted to swing outwardly under the influence of the centrifugal action, for splashing and agitating the lubricant.

3. The combination with an axle, a journal box for the spindle end thereof, revoluble means mounted in the journal box and in contact with the spindle end, and devices loosely carried and suspended on the revoluble means, and adapted to swing outwardly under the influence of the centrifugal action, for splashing and agitating the lubricant, and means carried by the revoluble means for causing the loosely suspended means to substantially adhere to the revoluble means.

4. The combination with an axle, a journal box for the spindle end thereof, revoluble means in the journal box, yieldable guide bearings for the revoluble means, and means loosely carried by and suspended on the revoluble means, adapted to swing outwardly under the influence of the centrifugal action, for agitating and splashing the lubricant.

5. The combination with an axle, a journal box for the spindle end thereof, revoluble means in the journal box, yieldable guide bearings for the revoluble means, and means loosely carried by and suspended on the revoluble means, adapted to swing outwardly under the influence of the centrifugal action, for agitating and splashing the lubricant, and means formed on the revoluble means to cause the loosely suspended means to adhere substantially to the revoluble means.

6. The combination with an axle, of a journal box for the spindle end thereof, spring tensioned guide bearings in the box, a revoluble member journaled in the bearings and having annular channels, and enlarged loop chains loosely suspended in the channels, and adapted to swing outwardly under the influence of the centrifugal action, for agitating and splashing the lubricant on the spindle end of the axle.

7. The combination with an axle, of a journal box for the spindle end thereof, spring tensioned guide bearings in the box, a revoluble member journaled in the bearings and having annular channels, and enlarged loop chains loosely suspended in the channels, and adapted to swing outwardly under the influence of the centrifugal action, for agitating and splashing the lubricant on the spindle end of the axle, and means formed on the bottoms of the channels, to cause the chains to adhere to the bottoms of the channels, thereby avoiding the bottoms of the channels from sliding with relation to the chains.

8. The combination with an axle, of a journal box for the spindle end thereof, bearing members in the box, revoluble means mounted in the bearing members, looped chains loosely carried by and suspended on the revoluble means and adapted to swing outwardly under the influence of the centrifugal action for agitating and splashing the lubricant.

9. The combination with an axle, of a journal box for the spindle end thereof, bearing members in the box, revoluble means mounted in the bearing members, looped chains loosely carried by and suspended on the revoluble means and adapted to swing outwardly under the influence of the centrifugal action for agitating and splashing the lubricant, and means formed on the revoluble means for causing the chains to adhere to the revoluble means.

10. The combination with an axle, of a journal box for the spindle end thereof, a lubricant container in the box, said container having guides, spring tensioned bearing members in the guides, a revoluble roller journaled in the spring tensioned bearings and provided with annular channels, the bottoms of which being provided with flat portions, looped chains loosely engaging and suspended in the channels and engaging the flat portions, whereby the chains are swung outwardly under the influence of the centrifugal action, thereby agitating and splashing the lubricant.

11. The combination with an axle, of a journal box for the spindle end thereof, a lubricant container in the box, said container having guides, spring tensioned bearing members in the guides, a revoluble roller journaled in the spring tensioned bearings and provided with annular channels, the bottoms of which being provided with flat portions, looped chains loosely engaging and suspended in the channels and engaging the flat portions, whereby the chains are swung outwardly under the influence of the centrifugal action, thereby agitating and splashing the lubricant, and means on the surface of the roller intermediate the channels, for feeding the lubricant from one channel to another and toward the ends of the roller, to their bearings.

12. The combination with an axle, of a journal box for the spindle end thereof, a lubricant container in the box, said container having guides, spring tensioned bearing members in the guides, a revoluble roller journaled in the spring tensioned bearings and provided with annular channels, the bottoms of which being provided with flat portions, looped chains loosely engaging and suspended in the channels and engaging the flat portions, whereby the chains are swung outwardly under the influence of the centrifugal action, thereby agitating and splashing the lubricant, and means on the surface of the roller intermediate the channels, for feeding the lubricant from one channel to another and toward the ends of the roller, to their bearings, the end walls of the container having means for returning the lubricant to the bottom of the retainer.

13. The combination with an axle, of a journal box for the spindle end thereof, revoluble means mounted in the journal box and in contact with the spindle end, and flexible devices carried by and swingingly suspended on and feeding about and relatively to the revoluble means as the latter revolves, and actuated thereby for splashing and agitating the lubricant.

14. The combination with an axle, of a journal box for the spindle end thereof, revoluble means mounted in the journal box and in contact with the spindle end, a flexible means on the revoluble means and being swingingly suspended, whereby, as the revoluble means rotates, the flexible means swings in contact with the spindle and splashes and agitates the lubricant alternately therewith.

In testimony whereof I hereunto affix my signature in the presence of two witnesses.

FOYDICE C. BUELL.

Witnesses:
CHAS. L. FAWCETT,
R. T. SCHUGART.

Copies of this patent may be obtained for five cents each, by addressing the "Commissioner of Patents, Washington, D. C."